United States Patent [19]

Harrison et al.

[11] 4,248,649
[45] Feb. 3, 1981

[54] METHOD FOR PRODUCING A COMPOSITE STRUCTURE

[75] Inventors: John Harrison, Morley; Frederick Allsopp, Kilburn; Geoffrey Elliott, Littleover, all of England

[73] Assignee: Rolls-Royce Limited, London, England

[21] Appl. No.: 2,305

[22] Filed: Jan. 10, 1979

[30] Foreign Application Priority Data

Jan. 19, 1978 [GB] United Kingdom ............... 02141/78

[51] Int. Cl.³ .................. B29D 3/02; B29C 27/26
[52] U.S. Cl. .................................................. 156/174
[58] Field of Search ............... 264/137, 101, 102, 138, 264/157, 248, 313, 257, 258, 241, 285, 295, 263, 219; 138/118, 174, DIG. 2, 144; 60/200 A; 156/173, 194, 245, 169, 174, 175, 180–182, 193, 196, 218, 242, 250, 253, 256, 264, 266, 285, 172; 415/219 R, 219 C; 428/65

[56] References Cited

U.S. PATENT DOCUMENTS

| | | | |
|---|---|---|---|
| 1,943,528 | 1/1934 | Hicks | 244/133 |
| 2,749,266 | 6/1956 | Eldred | 264/259 |
| 3,083,131 | 3/1963 | Wentz | 156/257 |
| 3,084,087 | 4/1963 | Weil et al. | 156/173 |
| 3,637,446 | 1/1972 | Elliott et al. | 156/182 |
| 3,673,611 | 7/1972 | Cain et al. | 264/258 |
| 3,700,535 | 10/1972 | McCoy et al. | 156/175 |
| 3,773,581 | 11/1973 | Stanley | 264/257 |
| 3,784,428 | 1/1974 | Willats et al. | 156/174 |
| 3,913,108 | 10/1975 | Branen | 156/173 |
| 3,962,393 | 6/1976 | Blad | 264/101 |
| 3,965,235 | 6/1976 | White | 264/137 |
| 3,966,523 | 6/1976 | Jakobsen et al. | 156/173 |
| 3,966,864 | 6/1976 | Stenzenberger | 264/137 |
| 4,038,118 | 7/1977 | James | 244/54 |

FOREIGN PATENT DOCUMENTS

| | | | |
|---|---|---|---|
| 759373 | 10/1956 | United Kingdom | 264/258 |
| 1149549 | 4/1968 | United Kingdom | 264/258 |
| 1262704 | 2/1972 | United Kingdom | 264/258 |
| 1264432 | 2/1972 | United Kingdom | 264/137 |

Primary Examiner—W. E. Hoag
Attorney, Agent, or Firm—Cushman, Darby & Cushman

[57] ABSTRACT

A method of producing a composite structure consists of winding a resin impregnated filament tow onto a former or formers having surfaces which correspond with a portion of the finished article, removing the fibre sheets from the former or formers, and placing them in a mould which corresponds in shape to that of the complete article, and pressing the fibre within the mould to consolidate the finished article.

10 Claims, 3 Drawing Figures

U.S. Patent        Feb. 3, 1981        4,248,649
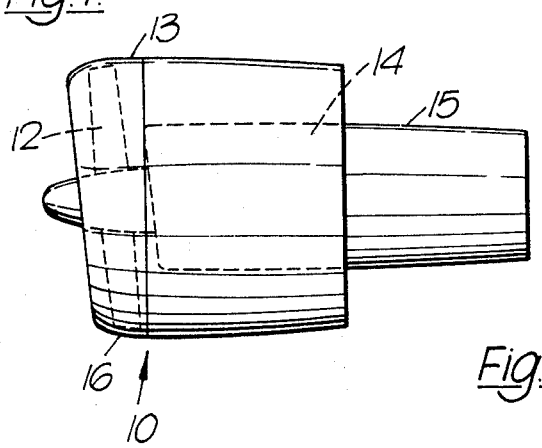
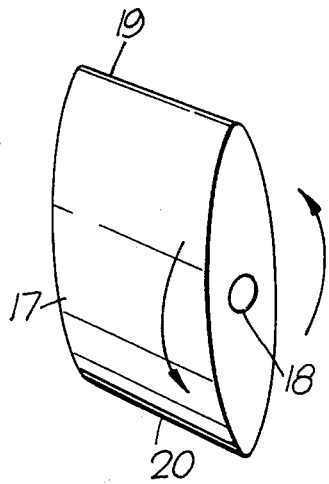
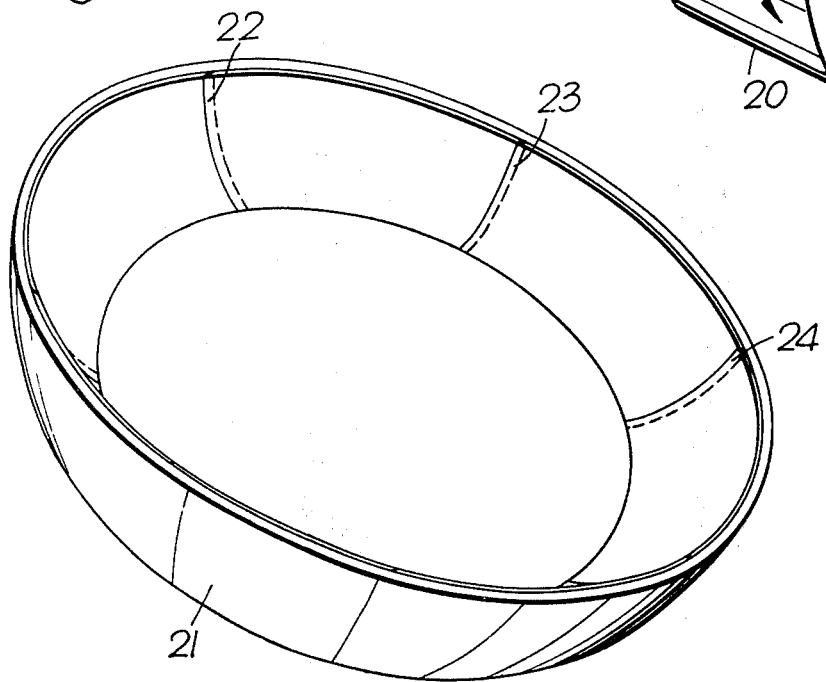

METHOD FOR PRODUCING A COMPOSITE STRUCTURE

This invention relates to a method and apparatus for producing a composite structure, and more particularly to a method of manufacturing at least a portion of a casing for a gas turbine engine from such a structure.

In order to reduce the weight of gas turbine engines, many attempts have been made to manufacture casings and such structures from composite material. The composite material regarded as particularly suitable for such application is either carbon or glass or other similar type fibres secured together within a resin matrix. The choice of which material is used is dependent amongst other things on the temperature at which the finished casing is to operate.

To ensure maximum casing strength for a given fibre volume the resin impregnated tows of fibre are wound onto a mandrel to form the shape of the casing. This method however unfortunately suffers two main disadvantages; firstly during the winding process it is extremely difficult to ensure that the filament tows are pressed closely together upon the mandrel to ensure the finished structure is free from voids and cavities which would adversely affect its strength. Secondly such a method of manufacture is not suitable for producing a casing which is not perfectly cylindrical, or a cylindrical surface which has a compound curvature thereon. In this case, during the winding process, either the fibres tend to build up in thickness in one particular area or alternatively they may slip off the ends of the mandrel.

An object of the present invention is to manufacture at least a portion of a gas turbine engine casing from a composite structure by a method which substantially eliminates the aforementioned disadvantages.

According to the present invention a method of producing a composite structure comprises producing at least one former, the or each former having a surface which corresponds with a portion of the surface of the completed composite structure, winding at least one filament of fibre material onto the surface of the former or formers to produce a layer or layers of fibre which reinforce a resin matrix to form at least one layer of fibre reinforced resin, removing the fibre reinforced resin layer or layers from the former or formers, and placing the layers upon the surface of a mould, which surface corresponds to the completed shape of the finished composite structure, and subsequently exerting pressure upon the fibre reinforced resin layers to consolidate them prior to curing the resin.

Preferably the fibres comprise a multi-filament tow which may be wound dry upon the former or formers, and at least one layer of resin is then applied to the wound fibres, both the fibres and resin then being subjected to both heat and pressure such that substantially all the fibres become coated with resin.

Alternatively the at least one fibre may comprise a multi-filament tow of fibres which is resin impregnated prior to being wound upon the former or formers.

Preferably the composite structure comprises at least a portion of the outer skin of a gas turbine engine fan duct casing.

The set of formers may each have two surfaces each of which corresponds with a portion of the surface of the outer skin of the fan casing, and the mould preferably comprises a female mould, the interior surface of which corresponds in shape to a portion of the outer skin of the gas turbine fan duct casing, and a vacuum bag is placed within the female mould which is then evacuated to exert pressure upon the partially cured fibre portions to consolidate them prior to, and during the final curing process which may be carried out in an autoclave.

Preferably the at least one filament of fibre material comprises carbon fibres or alternatively glass fibres, or KEVLAR (registered trade mark).

For better understanding of the invention an embodiment thereof will be more particularly described by way of example only and with reference to the accompanying drawings in which:

FIG. 1 shows a pictorial side view of a gas turbine engine which includes a composite casing portion made in accordance with an embodiment of the present invention, FIG. 2 shows a pictorial view of a first former which is used in the manufacture of the composite casing portion, and FIG. 3 shows a pictorial view of a mould which is used in the manufacture of the composite casing portion.

Referring to the drawings, a gas turbine engine shown generally at 10 comprises a front fan 12 which is housed within a fan duct casing 13, and a gas generator 14 is arranged within the engine casing 15 downstream of the fan 12 and concentric with the fan duct casing 13. The upstream portion 16 of the outer skin of the fan duct casing 13 comprises a composite structure which is made in accordance with an embodiment of the present invention.

To manufacture the fan casing portion 16, a plurality of formers one of which is shown at 17 in FIG. 2 are produced. Each of the formers 17 have two major surfaces which are shaped to conform to a portion of the surface of the outer skin of the fan casing portion 16. For the sake of simplicity, it has been found relatively easy to manufacture the formers from portions of a pattern of a completed fan casing shape which is divided into separate pieces each pair of which are secured together back to back to produce the formers 17.

Each of the formers 17 is rotated upon a mandrel which is secured within the hole 18 or by other suitable means provided within the former. The formers are each coated with a suitable release agent and then layers of resin impregnated tows of carbon fibre or glass fibres or alternatively fibres manufactured by Du Pont Limited from aromatic polyamide such as for example that sold under the Registered Trade Mark KEVLAR are wound onto them. Alternatively the formers may be wound with dry fibre upon which is laid a resin film which is then subjected to heat and pressure to coat the fibres. The resin may then be partially cured to consolidate the fibres such that they are in a more handleable condition. The curing may be carried out by subjecting the fibres to a suitable heat source.

The partially cured resin impregnated fibres are then removed from the formers 17 by cutting across the fibres at the ends of the formers at 19 and 20. It has been considered that a groove or slot may be provided across the end at points 19 and 20 to facilitate the cutting of the fibres and thus simplify their removal from the former 17.

The complete outer skin portion 16 of the fan casing is subsequently manufactured using a mould 21 shown at FIG. 3. The mould may be manufactured from a glass fibre reinforced composite material or some other suitable material such as for example aluminium such that the former is not too cumbersome or heavy. To produce the fan casing portion 16, the internal surface of the mould 21 is first coated with a suitable release agent. The partially cured fibre portions are then placed in their respective locations upon the internal surface of the mould in slightly overlapping relationship as shown at 22, 23 and 24.

After the partially cured fibre portions are arranged within the mould it is necessary to subject them to pressure therein to ensure that the completed composite is substantially free from voids and also conforms exactly to the shape of the mould 21. This is achieved by placing a vacuum bag within the former 21 which is suitably constrained therein such that the mould can be evacuated such that the bag exerts a substantially equal pressure on all the portions of partially cured fibrous material arranged within the mould.

The mould 21 together with portions of partially cured fibrous material and a vacuum bag may then be placed within an autoclave where the final curing of the resin takes place. Curing in an autocave has the advantage that its operating pressure increases the pressure exerted upon the fibrous material sandwiched between the vacuum bag and the mould and this helps to further ensure the removal of substantially all voids within the structure. It will be appreciated that in this way relatively high pressures may be exerted upon the fibrous material without the necessity of a particularly strong or robust mould as the operating pressure within the autoclave will help to support the mould 21.

After autoclaving, the completed fan duct outer skin 16 may be removed from the mould 21 and suitable flanges which may also be manufactured from a suitable fibre reinforced resin material are bonded to its respective ends such that it may be secured to the remainder of the fan duct by either bonding or suitable mechanical means.

Although this description relates to a method of producing merely a portion of the outer skin of a gas turbine engine fan duct it is considered that ultimately it may be feasible to manufacture an entire fan duct or engine casing by this method. Also it is not considered that the invention is limited only to the production of gas turbine engine components as it could easily be adapted to many applications where light weight components are required such as for example, aircraft fuselage portions or rocket casings etc.

It will be readily appreciated that the present invention is particularly suitable for any application requiring a substantially cylindrical component where advantage can be taken of the high strength characteristics of a process which gives true circumferential fibres which enables the full hoop stress of the article to be realised. In addition the use of a female mould system produces a part on which the outside profile and surface must be carefully controlled. This is particularly important in the case of a gas turbine casing portion whose outside profile must be as smooth as possible.

We claim:

1. A method for making a composite structure, comprising:
cutting into sections a pattern of an article having an annular shape and a compound curvature, securing two of said sections back-to-back to make at least one former having plural shaping surfaces, each of which surfaces corresponds to a portion of the surface of said composite structure, winding at least one filament onto the surface of at least one said former to produce at least one layer of filament to reinforce a curable resin matrix and thereby form at least one filament-reinforced resin layer, dividing said resin layer into at least two preforms and removing the reinforced resin preforms from the at least one former and placing plural such preforms upon the surface of a mold, which surface corresponds to the completed shape of the finished composite structure, covering the surface of the mold, and subsequently exerting pressure upon the reinforced resin layers to consolidate them prior to curing the resin, and curing said resin.

2. A method of producing a composite structure as claimed in claim 1 in which the fibres comprise a multifilament tow which is wound dry upon the former, and at least one layer of resin is then applied to the wound fibres, both the fibres and resin being subjected to both heat and pressure such that substantially all the fibre becomes coated with resin.

3. A method of producing a composite structure as claimed in claim 1 in which the at least one fibre may comprise a multi-filament tow of fibres which is resin impregnated prior to being wound upon the former or formers.

4. A method of producing a composite structure as claimed in claim 1 in which the former each have two surfaces, each of which corresponds with a portion of the surface of the completed composite structure.

5. A method of producing a composite structure as claimed in claim 1 in which the mould comprises a female mold, the interior surface of which corresponds in shape to a portion of the outer skin of the gas turbine engine fan duct casing, and a vacuum bag is placed within a female mold which is then evacuated to exert pressure upon the fibre portions, resin of said portions being partially cured to consolidate them prior to, and during final curing process which is carried out in an autoclave.

6. A method of producing a composite structure as claimed in claim 1 in which the material of at least one filament has been selected from the group consisting of carbon, glass and aromatic polyamide.

7. A method of producing a fiber reinforced resin filled composite compound curvature structure comprising the steps of:
(1) cutting into sections a pattern of an article having an annular shape and a compound curvature, securing two of said sections back-to-back to make at least one former having plural shaping surfaces, each of which surfaces corresponds to a portion of said composite structure,
(2) winding filaments onto the surface of said at least one former producing at least one layer of fiber which reinforces a curable resin matrix, applying said curable resin and thereby forming at least one layer of fiber-reinforced resin;
(3) cutting the thus-wound fibers along the two ends of the former to provide two pieces of fiber reinforced resin;
(4) removing each of the fiber-reinforced resin pieces of step (2) from the former and successively placing each of the thus-removed pieces upon the interior surface of a mold, the interior surface corresponding in shape to the completed shape of the finished composite structure;

(5) successively repeating each of steps (1), (2), (3) and (4) until the interior surface of the mold is covered with the desired number of fiber reinforced resin pieces and the shape of the finished composite structure is completed;

(6) subjecting the assembled fiber reinforced resin pieces to pressure to consolidate and conform the assembled resin pieces into a unitary whole conforming to the shape of the mold;

(7) curing the assembly to form a rigid composite structure; and (8) removing the cured composite structure from the mold.

8. A method of producing a fiber reinforced resin filled composite compound curvature structure comprising the steps of:

(1) cutting into sections a pattern of an article having an annular shape and a compound curvature, securing two of said sections back-to-back to make at least one former having plural shaping surfaces each of which surfaces corresponds to a portion of the surface of said composite structure;

(2) winding filaments onto the surface of the former producing at least one layer of fiber which reinforces a curable resin matrix, applying a curable resin and forming at least one layer of fiber-reinforced resin;

(3) dividing said layer into plural portions;

(4) removing the fiber reinforced resin portions of step (3) from the former and successively placing the thus removed portions upon the interior surface of a mold, the interior surface corresponding in shape to the completed shape of the finished composite structure;

(4) repeating steps (1) through (4) until the interior surface of the mold is covered with the desired number of fiber reinforced resin layers and the shape of the finished composite structure is completed;

(5) subjecting the assembled fiber reinforced resin portions to pressure to consolidate and conform the assembled portions into a unitary whole having the shape of the mold;

(6) curing the assembly to form a rigid composite structure; and (7) removing the cured composite compound curvature structure from the mold.

9. The method of claim 8 including partially curing the resin of the at least one layer of step (2) before said portions are placed upon the interior surface of said mold.

10. The method of claim 8 wherein the material of the filaments is selected from the group consisting of carbon, glass and aromatic polyamides.

* * * * *